United States Patent
Koeth et al.

(10) Patent No.: US 7,546,658 B2
(45) Date of Patent: Jun. 16, 2009

(54) TOOTHBRUSH

(75) Inventors: Michael Koeth, Buehl (DE); Wolf-Dieter Mueller, Buehl (DE); Klaus Reinbold, Buehl (DE); Thomas Clos, Neustadt (DE); Andreas Lanvers, Neustadt (DE); Christoph Geiberger, Herne (DE)

(73) Assignee: GlaxoSmithKline Consumer Healthcare GmbH & Co. KG, Buehl (Baden) (DE)

( * ) Notice: Subject to any disclaimer, the term of this patent is extended or adjusted under 35 U.S.C. 154(b) by 0 days.

(21) Appl. No.: 10/491,483

(22) PCT Filed: Oct. 3, 2002

(86) PCT No.: PCT/EP02/11091

§ 371 (c)(1), (2), (4) Date: Apr. 1, 2004

(87) PCT Pub. No.: WO03/030680

PCT Pub. Date: Apr. 17, 2003

(65) Prior Publication Data

US 2005/0039279 A1 Feb. 24, 2005

(30) Foreign Application Priority Data

Oct. 5, 2001 (GB) .................................. 0123939.1

(51) Int. Cl.
*A46B 13/02* (2006.01)
(52) U.S. Cl. ........................................ 15/167.1; 15/110
(58) Field of Classification Search ................. 15/167.1, 15/110, 207.2; D4/104
See application file for complete search history.

(56) References Cited

U.S. PATENT DOCUMENTS

| | | | | |
|---|---|---|---|---|
| 1,724,955 A | * | 8/1929 | Mitchell | 15/167.1 |
| 4,128,910 A | | 12/1978 | Nakata et al. | |
| 4,288,883 A | | 9/1981 | Dolinsky | |
| 5,335,389 A | | 8/1994 | Curtis et al. | |
| 5,341,537 A | | 8/1994 | Curtis et al. | |
| 5,373,602 A | | 12/1994 | Bang | 15/167.1 |
| 5,446,940 A | | 9/1995 | Curtis et al. | |
| 5,465,450 A | * | 11/1995 | Humphries | 15/167.1 |
| 5,628,082 A | * | 5/1997 | Moskovich | 15/110 |
| 5,735,011 A | * | 4/1998 | Asher | 15/167.1 |
| 5,758,383 A | | 6/1998 | Hohlbein | |
| 5,799,353 A | | 9/1998 | Oishi et al. | 15/167.1 |
| 5,896,614 A | * | 4/1999 | Flewitt | 15/167.1 |
| 5,991,958 A | | 11/1999 | Hohlbein | |
| 5,991,959 A | * | 11/1999 | Raven et al. | 15/201 |
| 6,041,467 A | * | 3/2000 | Roberts et al. | 15/167.1 |
| 6,073,299 A | | 6/2000 | Hohlbein | |
| 6,276,021 B1 | | 8/2001 | Hohlbein | 15/167.1 |

(Continued)

FOREIGN PATENT DOCUMENTS

EP A 0360766 9/1989

(Continued)

*Primary Examiner*—Laura C Guidotti
(74) *Attorney, Agent, or Firm*—Nora Stein-Fernandez; Theodore R. Furman (57) ABSTRACT

A toothbrush head having elastomeric oral hygiene parts in the form of elastomeric strips aligned non-perpendicular to the length direction of the head. Preferably adjacent pairs of strips are linked to form a strip of "V" cross section. Preferably the head comprises flexibly linked segments and is flexibly linked to the toothbrush handle.

27 Claims, 4 Drawing Sheets

U.S. PATENT DOCUMENTS

| | | | |
|---|---|---|---|
| 6,314,606 B1 | 11/2001 | Hohlbein | |
| 6,370,726 B1 * | 4/2002 | Kini et al. | 15/167.1 |
| 6,421,867 B1 * | 7/2002 | Weihrauch | 15/28 |
| 6,442,787 B2 | 9/2002 | Hohlbein | |
| 6,514,445 B1 * | 2/2003 | Cann et al. | 264/243 |
| 2001/0001335 A1 * | 5/2001 | Beals | 15/167.1 |
| 2006/0117508 A1 | 6/2006 | Hohlbein | |

FOREIGN PATENT DOCUMENTS

| | | |
|---|---|---|
| GB | 214701 | 1/1923 |
| GB | 2040161 | 1/1980 |
| GB | 2214420 | 1/1998 |
| WO | WO92/17093 | 10/1992 |
| WO | WO96/02165 | 2/1996 |
| WO | WO96/15696 | 5/1996 |
| WO | WO96/28994 | 9/1996 |
| WO | WO97/07707 | 3/1997 |
| WO | WO97/16995 | 5/1997 |
| WO | WO97/24048 | 7/1997 |
| WO | WO97/24949 | 7/1997 |
| WO | WO98/37788 | 9/1998 |
| WO | WO99/37181 | 7/1999 |
| WO | WO00/49911 | 8/2000 |
| WO | WO00/64307 | 11/2000 |
| WO | WO00/70997 | 11/2000 |
| WO | WO00/76369 | 12/2000 |
| WO | WO01/01817 | 1/2001 |
| WO | WO01/21036 | 3/2001 |

* cited by examiner

TOOTHBRUSH

FIELD OF THE INVENTION

This invention relates to toothbrush heads, in particular to toothbrush heads having elastomeric oral hygiene parts on their head to contact the teeth and gums, and especially to the heads of such toothbrushes.

BACKGROUND OF THE INVENTION

Toothbrushes are known articles, generally comprising a head and a grip handle, disposed along a longitudinal head-handle direction, with a neck longitudinally in between the head and handle. The head is generally elongate between a tip distant from the handle and a base closest to the handle, and is flattened in its thickness direction generally perpendicular to the longitudinal direction, and has a widthwise direction perpendicular to both the longitudinal and thickness directions.

The head normally has a face from which one or more oral hygiene parts such as tooth-cleaning parts, e.g. bristles project in a bristle direction generally perpendicular to the longitudinal direction, and an opposite face, these faces being joined by edge surfaces. As the face is normally generally planar bristles project in a bristle direction generally perpendicular to the face. The head may be an integral part with the handle, or may be replaceably attachable to the handle or handle-neck unit. Toothbrushes are generally made from hard plastics materials such as polypropylene, but many these days are two-component, i.e. having a hard plastics skeleton and one or more softer elastomeric parts e.g. to enhance the grip handle and/or to provide elastomeric parts of flexible links. Among such two component toothbrushes are the applicant's Dr BEST™ and AQUAFRESH™ range of toothbrushes.

Toothbrushes having elastomeric oral hygiene parts on their head to contact the teeth and gums are known. The term "oral hygiene part" as used herein refers to a part which contributes to oral hygiene, for example by cleaning the teeth, gums or other oral tissues, and/or massaging the gums or other oral tissues. GB-A-2 040 161 discloses longitudinally extending elastomer strips. GB-A-2 214 420 and WO-A-00/49911 both disclose a toothbrush having a head from which project small rubber pyramids. GB-A-214 701 discloses a toothbrush having oral hygiene parts comprised of strips of crepe rubber, in one theoretically discussed embodiment of which the strips may have bristles sandwiched between the strips of crepe rubber. EP-A-0 360 766 discloses small rubber cylinders with knobbed ends. U.S. Pat. No. 4,128,910 discloses a toothbrush having rubber oral hygiene parts of various pyramid and ridge shapes. U.S. Pat. No. 4,277,862 discloses a toothbrush having resilient gum massage parts along the outer edges of the bristle pattern. U.S. Pat. No. 4,288,883 discloses rubber cones. U.S. Pat. No. 5,040,260 discloses a toothbrush having a head from which extend small rubber cones. WO-A-96/15696 discloses a toothbrush head provided with strips of a flexible and resilient material, typically a non-elastomeric nylon material, and typically aligned either perpendicular to or parallel to the longitudinal direction. WO-A-96/28994 discloses elastomer bars extending perpendicular to the longitudinal direction and parallel to the edges of the head in combination with bristle "bars" having an elongate cross section cut across the bristle direction, and also discloses a curved rubber "scooping bar" at the tip end of the head. WO-A-97/16995 discloses elastomer "bristles". WO-A-98/18364 discloses tooth polishing pads or finger-like structures. WO-A-99/37181 discloses an outer ring of rubber fingers surrounding an inner dense pack of bristles. WO-A-00/64307 discloses rubber bars with a generally triangular cross section. WO-A-00/76369 discloses elastomeric massaging parts with rotational symmetry through an angle of 120° or less e.g. cylinders. WO-A-01/21036 discloses a longitudinally extending elastomeric wall-like member running for at least half the length of the head.

Such elastomeric parts are provided inter alia to massage and/or stimulate the gums and to clean the teeth and gums. Often they are provided on a toothbrush head in a cluster together with conventional bristles, e.g. made of known nylon materials, to supplement and enhance the tooth and gum cleaning effect of the bristles.

"Flexible head" toothbrushes are also known with two or more flexibly and resiliently linked segments in their head, i.e. a "multiple segment" head, see for example WO-A-92/17093, WO-A-96/02165, WO-A-97/07707 and WO-A-97/24048. It is also known to provide toothbrushes with a head which is connected by a flexible link to the handle, see for example WO-A-92/17092 and WO-A-97/24949. It is also known to provide toothbrushes with a head which is connected by a flexible link to the handle, and which also has two or more flexibly and resiliently linked segments in its head, see for example WO-A-98/37788.

The content of these patent publications is incorporated herein by reference.

SUMMARY OF THE INVENTION

It is an object of this invention to provide an improved construction of a toothbrush having the above-mentioned elastomeric oral hygiene parts on their head.

According to one aspect of this invention a toothbrush head is provided, comprising two or more segments flexibly and resiliently linked to each other, one or more of the segments having a face on which is mounted one or more elastomeric oral hygiene part.

DETAILED DESCRIPTION OF THE INVENTION

Preferably the segments are longitudinally sequentially disposed.

Preferably the flexible head comprises two segments being a substantially rigid base segment adjoining the toothbrush neck and extending from the base end of the head to a resilient flexible link situated between the base end and the tip, and a tip segment extending from the tip of the head to the link, the tip segment being flexibly and resiliently linked at the link to the base segment.

Herein the term "tip segment" refers to that segment(s) of a multiple-segment toothbrush which is closest to the tip of the head. Herein the term "base segment" refers to that segment(s) of a multiple-segment toothbrush which is closest to the tip of the head. Preferably the toothbrush head has only two such segments, being a tip segment and a base segment, linked by the resilient flexible link.

Preferably the base segment extends for at least 50%, suitably at least 60%, for example at least 75% of the distance between the base end of the head and the tip of the head.

When not being used, i.e. when at rest not being subjected to the forces of toothbrushing, the respective faces of adjacent segments may be substantially coplanar, or alternatively the respective faces of adjacent segments, particularly longitudinally adjacent segments, may form an angle of less than 180° with each other. For example the respective faces of the tip segment and of the base segment in such a flexible head may be substantially coplanar, i.e. with a substantially 180° angle between them. Preferably the face of the tip segment may form an angle of less than 180° with the face of the base segment, e.g. 150°-179°, suitably 155°-170°.

Such a flexible head may be as disclosed in above-mentioned WO-A-92/17093, WO-A-97/07707, WO-A-97/24048 and WO-A-96/02165. Typically in such a flexible head the resilient flexible link between two adjacent segments of the head may comprise a region between the segments including elastomeric material. Typically the construction of such a link may comprise an aperture in the head between the segments, bridged by a flexible strip of plastic material. For example a face of the head may have one or more groove therein, the lands on each side of the groove comprising the segments, and flexible resilient linking occurs about a thinned region, e.g. a thin strip of head material at the bottom of the groove, the groove containing an elastomeric material. There may be such a groove in one face of the head, e.g. that from which the oral hygiene part(s) extend, or in the opposite face, or in both faces, such that the thin strip of head material is at the respective bottom of both of the grooves. In one or more place such a groove may cut completely through the thickness of the toothbrush head.

Such a flexible head may be permanently attached to the handle, e.g. integrally made together with the handle. Alternatively the head may be replaceably attachable to the handle. Suitably there is a neck between the head and handle. The head and handle are disposed along a toothbrush longitudinal direction, with such a neck longitudinally between the head and handle.

According to another aspect of this invention a toothbrush is provided with a head which is connected by a resiliently flexible link to the handle, and having a face on which is mounted one or more elastomeric oral hygiene part.

The construction of flexible link between the head and handle may for example be as disclosed in WO-A-92/17092 and WO-A-97/24949, for example comprising a thin, flexible plastic material spine linking the head and handle, usually linking the head and neck, the spine being wholly or partly surrounded by a mass of elastomer, e.g. a mass of elastomer with a generally spherical profile.

The toothbrush head of this second aspect may be a flexible head as described above, for example comprising two or more segments flexibly and resiliently linked to each other, one or more of the segments having a face on which is mounted one or more elastomeric oral hygiene part, for example comprising two respective longitudinally disposed tip and base segments. The flexible link to the handle will normally be between the base segment and the handle. The overall construction of such a toothbrush may be for example as disclosed in WO-A-98/37788.

The one or more elastomeric oral hygiene part may be mounted on one or more segment of such a flexible toothbrush head, for example on the tip segment and/or base segment of a two segment flexible head.

The one or more elastomeric oral hygiene part in the above aspects of the invention may be of known type, for example one or more of the known small rubber cones, small rubber pyramids, strips of rubber, elastomer "bristles", tooth polishing pads or finger-like structures, elastomer bars e.g. of a generally rectangular cross section, elastomeric massaging parts with rotational symmetry through an angle of 120° or less e.g. cylinders, a resilient elastomer wall-like member, and small rubber cylinders with knobbed ends etc. as mentioned above.

One preferred form of elastomeric oral hygiene part comprises an elastomeric finger, for example a cylinder typically 0.5-2.0 mm diameter, preferably ca. 1-1.5 mm diameter, and about the same length as conventional bristles. All of a plurality of such fingers may have the same length, or cylinders of different lengths may be used. Such fingers may have gently tapering sides, i.e. being slightly conical, i.e. narrower at the end remote from the face, and they may have convexly rounded ends remote from the face, and/or may have a small concavity or dimple at the end remote from the face.

For example a plurality of such fingers may be mounted in a polygonal cluster on the tip segment of a flexible head as described above, for example a cluster comprising a polygon of 5 to 8, preferably 6 or 7, such cylinders surrounding a central cylinder.

In a further aspect, this invention also provides novel constructions of elastomeric oral hygiene part suitable for mounting on the face of a toothbrush head, particularly the toothbrush heads described above having multiple flexibly-linked segments and/or a flexible link between the head and handle.

For example according to this further aspect of this invention, a toothbrush head is provided having a face, and having an elastomeric oral hygiene part mounted thereon, characterised in that the elastomeric oral hygiene part comprises an adjacent pair of elastomeric strips which each project from the face of the toothbrush head in a strip length direction, each elastomeric strip having a strip width direction generally perpendicular to the strip length direction the strip width dimension being less than the strip length direction, and a strip thickness direction generally perpendicular to both the strip length and strip width direction, the strip thickness dimension being less than the strip width direction, the adjacent strips being aligned so that their respective width directions converge to define an angle of 180° or less between them.

Typically the strip width dimension is 0.30 or less of the strip length dimension, for example 0.25 or less, preferably 0.2 or less. The strip thickness may for example be 0.1-1.5 mm, typically 0.75-1.25 mm e.g. 0.9+/−0.1 mm.

Typically the width directions converge to define an angle between them of 120° or less, preferably between 100° to 40°, more preferably between 90° to 60°, for example ca. 70°.

Suitably the cross section of each strip cut across the strip length direction may be generally straight linear, e.g. each strip may have a generally parallel sided cross section. For example in cross section each strip may be generally rectangular, e.g. with one or more rounded end, or parallelogram shaped. Alternatively the cross section of each strip cut across the strip length direction may present a concave or convex curved side facing outwardly, for example a concave part-circular or part-oval curved surface.

The width directions of such longitudinally adjacent strips may converge in a direction transverse to the longitudinal direction, either away from or toward the centre of the head, suitably in a transverse direction generally perpendicular to the longitudinal direction. Alternatively the respective width directions of widthwise adjacent strips may converge in a direction parallel to the longitudinal direction, either toward or preferably away from the handle.

Preferably two such adjacent strips are linked such that the pair of strips comprise a single strip with a cross section, cut across the strip length direction, which is "V" shaped, i.e. chevron shaped, the limbs of the chevron converging to define the said angle of less than 180° between them.

Typically the limbs may converge to define an angle between them of 120° or less, preferably between 100° to 40°, more preferably between 90° to 60°, for example ca. 70°.

Typically the strip width dimension of each of the two adjacent linked strips, i.e. as measured from the link between the strips to the edge furthest from the link is 0.30 or less of the strip length dimension, for example 0.25 or less, preferably 0.2 or less.

Suitably the outer surface of each limb of the chevron cut across the strip length direction may be generally straight linear, e.g. each limb may have a generally parallel sided cross section. Alternatively each limb of the chevron may present a curved side facing outwardly, for example a concave or convex part-circular or part-oval curved surface. The chevron may have a sharply angled point, or alternatively the point may be rounded.

The chevron may for example point in a direction transverse to the longitudinal direction, preferably generally perpendicular to the longitudinal direction, either outwardly from or preferably inwardly toward the longitudinal axis of the toothbrush head, or respective chevrons pointing in both directions may be used in combination. A plurality of such chevron sectioned elastomeric strips pointing in a direction transverse to the longitudinal direction may be provided sequentially longitudinally with their points pointing inwardly, and with the edges of the limbs of the chevron adjacent to the edge of the face of the head on which it is mounted.

A plurality of such chevron sectioned strips may comprise discrete individual chevron sectioned strips or alternatively they may be linked into a zig-zag arrangement.

Alternatively for example the chevron may point in a direction generally longitudinally, e.g. substantially parallel to the longitudinal direction, either toward or preferably away from the handle, preferably coaxial with the longitudinal axis of the head. For example a plurality of such chevron sectioned elastomeric strips with their points pointing in a direction parallel to the longitudinal direction away from the handle may be provided longitudinally adjacent to each other, with the point of one chevron nesting into the concave "bite" of a longitudinally adjacent another.

One or more chevron sectioned strip may be disposed in various arrangements on the toothbrush head. For example in a multiple segment flexible head one or more such chevron sectioned elastomeric strip pointing in a direction transverse to the longitudinal direction as described above may be provided on the base segment. For example in a multiple segment flexible head one or more such chevron section strip pointing in a direction parallel to the longitudinal direction, either toward or preferably away from the handle, may be mounted on the tip segment. For example in a multiple segment flexible head one or more such chevron section strip pointing in a direction parallel to the longitudinal direction, either toward or preferably away from the handle, may be mounted on the base segment.

Two or more of the different types of oral hygiene parts described above may be used, for example a combination of one or more of the above described known cylinders, cones, strips etc. together with one or more pair of convergent strips, or chevron sectioned strip of this invention. For example a chevron sectioned strip, with its point pointing in the direction away from the handle to a point, may have its point flanked on each widthwise side by one or more strip of elastomeric material with its width direction substantially parallel to the outer surface of the limbs of the chevron, e.g. with its width direction aligned at a similar angle relative to the longitudinal axis of the head, as the limbs of a chevron.

Preferably the elastomeric oral hygiene part projects to the same or approximately the same length from the face as conventional bristles. Alternatively the part may project to a longer or shorter length from the face than any bristles which may be present on the face.

An elastomeric oral hygiene part may project substantially perpendicular to the face, or may be inclined. A suitable angle of inclination is ca. 80°, for example leaning so that the end of the oral hygiene part remote from the face is closer to the handle or the tip than is the end closest to the face.

The above-described novel elastomeric oral hygiene part(s) are suitable for use with the above-described toothbrush head comprising two or more segments flexibly and resiliently linked to each other, or/and connected by a resiliently flexible link to the handle.

In the toothbrush head of all aspects of this invention the above-described elastomeric oral hygiene part(s), whether of known type or of the novel type disclosed above may be combined in a cluster with bristles in various arrangements. In such a cluster the elastomeric oral hygiene part(s) may supplement the cleaning action of the bristles by for example massaging the gums. Some suitable examples of arrangements are described below.

For example the one or more elastomeric oral hygiene part may be mounted only on the tip segment, the other segment(s) having only bristles as their oral hygiene part. For example alternatively the one or more elastomeric oral hygiene part may be mounted only on the base segment, the other segment(s) having only bristles as their oral hygiene part. For example the head may consist of a flexibly linked tip segment and base segment, the tip segment may have bristles but no elastomeric oral hygiene parts mounted thereon, and the base segment may have elastomeric oral hygiene parts and optionally bristles thereon.

For example when the elastomeric oral hygiene parts comprise one or more above-described pair of convergent strips, for example the above described chevron sectioned strip, one or more bristle tuft may be located between the converging strips or limbs of the chevron, e.g. in the bite between converging limbs of a chevron.

For example if elastomeric oral hygiene parts are arranged as described above along the widthwise opposite edges of the head, then between these edges, i.e. about the central area of the head, there may be bristles.

Bristles of the toothbrush head may be arranged on the head in tufts containing a plurality of bristles. Such bristle tufts may be of circular cross section cut across the bristle direction, for example having a diameter similar to that of conventional circular cross section tufts. Alternatively the tufts may have a non-circular cross section.

For example the tufts may have a non-circular section, e.g an elongate non-circular cross section, cut across the bristle direction. Examples of elongate cross sections include a so called bristle "bar" which has a generally rectangular cross section, typically with rounded ends, or an oval cross section. The ends of such an elongate "bar" may be triangular or wedge shaped, e.g the bar may be rectangular with one or more triangular or wedge shaped end, or diamond shaped (i.e. two base-to-base triangles) to assist the tuft in "nesting" with an adjacent elastomeric strip such as a chevron-sectioned strip. The long dimension of such an elongate cross section may for example be aligned substantially perpendicular to or parallel to the longitudinal axis of the toothbrush head, or to an adjacent part of an edge of the face. For example alternatively the long dimension of an elongate cross section may be aligned at an angle which is neither perpendicular nor parallel to the longitudinal direction nor parallel to the closest adjacent part of the edge of the face. For example the long dimension may be aligned at an angle between 30° to 60° to the toothbrush head longitudinal direction, for example between 40° to 50°, e.g. ca. 45° to the longitudinal direction. The long dimensions of the cross sections of widthwise separated, e.g.

adjacent, such tufts may converge, for example toward the tip of the head. For example if an above-mentioned elastomeric oral hygiene part in the form of a pair of strips of converging width directions, or a chevron sectioned strip, is present, such a tuft may have its long dimension aligned substantially parallel to the width direction of the strip or limb of the chevron.

For example a tuft may have a non-circular cross section which has an angle which can nest into the bite between a pair of convergent elastomeric strips, e.g. of a chevron-sectioned strip. Such a tuft may for example have a triangular cross section cut across the bristle direction. The apex angle of such a tuft may correspond to the angle between the limbs of a chevron-sectioned strip into which it nests, or corresponding to the angle of an adjacent elastomeric strip. Examples of triangular sectioned tufts are for example disclosed in WO-A-9703587.

Alternatively such a tuft may have a cross section which is a chevron shape cut across its bristle direction, the limbs of the chevron forming an angle of less than 180° between them. Typically the angle between the limbs may be 120° or less, preferably between 100° to 80°, for example ca. 90°.

For example such a chevron sectioned tuft may be aligned so that it points in the longitudinal direction, preferably away from the handle. For example a chevron sectioned tuft may be nested with an above-mentioned chevron sectioned elastomeric oral hygiene part, either with the tuft nesting into the elastomeric part, or vice versa. For example there may be a longitudinal sequence of alternating of one or more such chevron sectioned tuft and one or more such chevron sectioned elastomeric oral hygiene part.

Bristles, whether in tufts of circular or non-circular cross section, may be mounted in the head with their bristle direction substantially perpendicular to the face.

In a further aspect the invention provides a novel toothbrush head, on which is mounted one or more elastomeric oral hygiene part, and on which bristles which lean at a non perpendicular angle to the face, so that the end of the bristle remote from the face is distanced longitudinally (which is preferred) or widthwise relative to the end closest to the face, are also mounted.

The head of the toothbrush of this aspect of the invention may be a head as described above, e.g. comprising two or more segments flexibly and resiliently linked to each other, one or more of the segments having a face on which is mounted the said one or more elastomeric oral hygiene part, and/or said head being connected by a resiliently flexible link to the handle. There may be both bristles and elastomeric oral hygiene parts on the faces of all segments, or bristles and oral hygiene parts may be respectively disposed on the faces of respective different segments.

For example bristles may be arranged in a tuft having an elongate cross section, e.g. as described above, and the angle at which the bristles within the tuft lean may vary with distance along the long dimension of the elongate cross section. For example at each end of the long dimension the bristles may lean in opposite directions away from the longitudinal centre of the tuft, and at the mid point of the long dimension the bristles may be perpendicular to the face, and at intermediate points between each end and the mid point the bristles may lean at an intermediate angle. The bristles consequently "fan" longitudinally away from the central position. The long dimension of such a tuft may be aligned generally parallel to the longitudinal axis, e.g. parallel to an adjacent part of the edge of the face. For example bristles in such an arrangement may fan out from this mid point.

For example the toothbrush head may have a face on which is mounted one or more elastomeric oral hygiene part, together with at least two widthwise separated tufts of bristles, the bristle directions of one such tuft being such that the end of the bristles remote from the face is distanced longitudinally relative to the end closest to the face, and the bristle directions of the other such tuft being such that the end of the bristles remote from the face is distanced longitudinally relative to the end closest to the face but in the opposite longitudinal direction, or is perpendicular to the face.

In addition to being separated widthwise such tufts may also be separated longitudinally.

For example tufts of bristles in a widthwise outer longitudinal row of bristles may lean in a first direction, and tufts of bristles in one or more widthwise inward row, e.g. in an a widthwise adjacent row, may lean in a second direction such that as viewed from a direction parallel to the widthwise direction of the head the alignment of the tufts is seen to converge or diverge, and/or preferably to cross.

The first and second directions may both be non-perpendicular to the plane of the face, alternatively a first or second direction may be a direction perpendicular to the face, and the respective second or first direction may be a non-perpendicular direction.

For example tufts of bristles may be arranged in substantially longitudinal rows, e.g. parallel to an edge of the face, and tufts in a row may be aligned, e.g. to lean non-perpendicularly in a first direction, for example toward or away from the tip of the head, and tufts in another longitudinal row may be aligned, e.g. to lean non-perpendicularly in a second direction opposite to the first direction, for example toward or away from the base of the head.

Typical non-perpendicular angles of lean may be in the range 70°-85°, typically ca. 80°, to the plane of the face, typically leaning toward the tip or the base of the head, for example leaning parallel to the longitudinal direction or parallel to an edge of the head.

Examples of such "crossed" bristles are disclosed in WO-A-99/23910, FR-A-2 624 360, U.S. Pat. No. 3,085,273, U.S. Pat. No. 5,274,873, U.S. Pat. No. 4,776,054, U.S. Pat. No. 3,085,273, U.S. Pat. No. 2,242,743, DE-G-82 02 897.4 among others, although without the presence of elastomeric oral hygiene parts, and their teaching is incorporated herein by way of reference.

With the above-described leaning bristles, the elastomeric oral hygiene part(s) may be of the known or novel types referred to above, and/or the toothbrush head may be the above-described toothbrush head comprising two or more segments flexibly and resiliently linked to each other, or/and connected by a resiliently flexible link to the handle.

Bristles present on the face of the toothbrush head may be all of substantially the same length, alternatively the bristles may be of differing lengths. One preferred such embodiment is the so called known "interdent" configuration in which sequentially longitudinally disposed tufts or groups of tufts alternate between greater and lesser lengths.

The face from which the elastomeric oral hygiene part(s) and bristles if present project may be planar. Alternatively the face may be non-planar, e.g. as disclosed in WO-A-9625866. Alternatively the face may be non-planar. For example the face may be stepped to define two or more levels relative to the opposite face. For example the face may comprise a central longitudinally aligned raised platform, flanked on both widthwise adjacent sides by relatively lower areas.

The term "elastomeric material" as used herein is synonymous with such terms as "elastomer", "elastomer material", "rubber" and "rubbery material". The term includes synthetic and natural elastomers. The term includes materials which on compression deform and spring back immediately or very quickly on release of the pressure. Preferably the elastomeric material is a thermoplastic elastomeric material to facilitate injection moulding.

For the above-described elastomeric material oral hygiene parts, preferably the elastomeric material has a hardness from about 10 to about 90 Shore A, more preferably 50 Shore A or less, e.g. from about 14 to about 35 Shore A. Suitable elastomeric materials include those available under the trade names Megol and Santoprene, and silicone elastomeric materials may also be used. Other suitable elastomeric polymers include styrenes (for example styrene ethylene butadiene styrene, or styrene butadiene styrene). Other suitable elastomeric materials are disclosed in the state of the art referred to above.

The plastics material of the toothbrush, and the elastomeric material of the above described flexible links, whether present in the link between the base and tip segments of the head when this is a composite segment, or in the link between the head and neck when this is a composite segment, may be plastics and elastomeric material as commonly used in two-component toothbrushes, e.g. that described in EP-A-0 336 641, which can be bonded to plastics materials used for toothbrush handle manufacture. Such an elastomeric material can be injected into the toothbrush mould shortly after injection moulding of the plastics material parts of the toothbrush so that the hot plastics material fuses and bonds with the elastomeric material. This is a generally known process and many toothbrushes are known which use this technology for example those sold under the names Dr BEST™ and AQUAFRESH™ by the applicant and its related companies.

Suitable plastics materials include those with a modulus of elasticity of at least about 500 Mpa, preferably at least about 1000 Mpa, these being conventional in the toothbrush art. Suitable materials include for example, polyamides and polypropylenes. An example of a suitable polyamide is the material 'Ultramid B3™' (marketed by BASF, Federal Republic of Germany), having a modulus of elasticity (DIN 53452) of 3000. An example of a suitable polypropylene is the material 'Novolene 1100 HX™' (marketed by BASF, Federal Republic of Germany), which is a homopolymer and has a modulus of elasticity (DIN 53457) of 1400. Such a polypropylene homopolymer may optionally be used in admixture with a polypropylene block co-polymer, such as the material 'Novolene 2500 HX™' (marketed by BASF, Federal Republic of Germany), for example in an 80:20 mixture by weight (1100 HX:2500 HX). Other suitable polypropylenes include Polypropylene PM 1600™ (marketed by Shell) and having a modulus of elasticity (ISO 178) of 1500 Mpa and Apryl 3400 MAI™ from Elf Atochem, Novolen 2400 H and 1106, and Borealis HG 365 P.

The toothbrush of the invention may be made by generally conventional injection moulding techniques, for example in which a plastics material "skeleton" is first made by injection moulding, leaving apertures in the skeleton into which elastomeric material may subsequently be injected to thereby form the elastomeric parts of the toothbrush. The elastomer parts may be introduced by a subsequent injection moulding step, in which the skeleton is enclosed in a second mould having one or more cavity which defines the shape of the elastomer parts, for example the said elastomer oral hygiene parts and or other elastomeric parts such a elastomeric parts of flexible links and/or grip enhancing features of the handle. Then the elastomeric material is injected into the mould cavity as a hot fluid and bonds to the plastics material. A suitable injection moulding process by means of which toothbrushes can be made having elastomeric materials disposed at separated places on a plastics material is disclosed in WO 94/05183 among others.

The elastomeric oral hygiene part(s) may be made by such an injection moulding process. It may be convenient to link two or more such parts by moulding channels in the plastic material of the head so that two or more elastomeric parts can be moulded fed with fluid elastomeric material from a single injection point and thence flow through the channels in the skeleton, this being known technology. Using such technology the elastomeric material may also be exposed on other parts of the head, for example to form a soft elastomeric buffer around the head (known in the art), or to form a base from which the elastomeric oral hygiene parts may project, and/or the elastomeric material may be exposed on the opposite face of the head for example to form a decorative pattern complementing the appearance of the oral hygiene part(s) on the face. A process of this kind is disclosed in WO-A-00/64307.

The bristles may also be of generally conventional construction, arrangement on the bristle face, and materials, and may be fastened into the bristle face by generally known techniques. The bristles of the toothbrush may be fixed into the head by either small metal anchors or fused into the plastics material of the head. These technologies are well known in the art.

BRIEF DESCRIPTION OF THE DRAWINGS

The invention will now be described by way of example only with reference to the accompanying figures which show.

Figure 1:
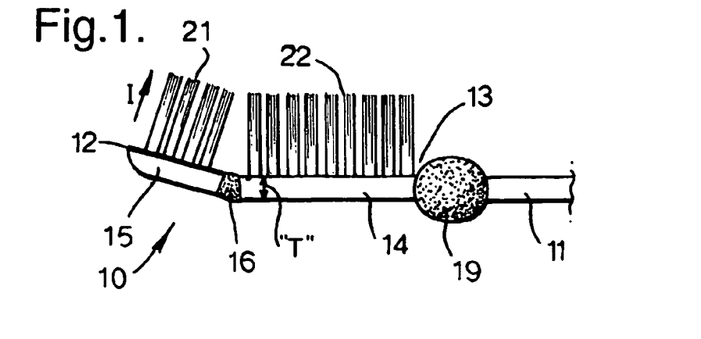
FIG. 1 shows a side view of one embodiment of a toothbrush head according to this invention.
Figure 2:
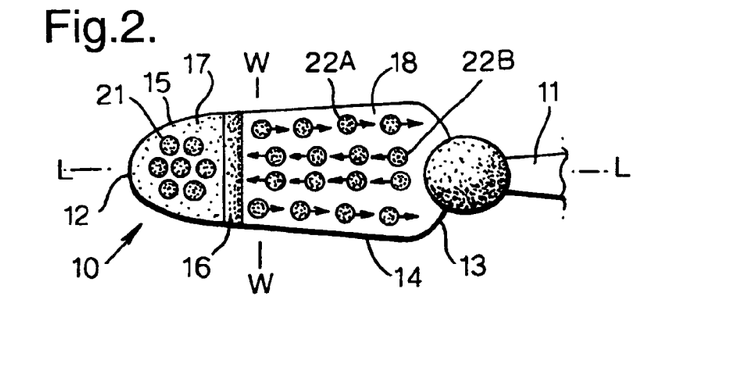
FIG. 2 shows a plan view of the embodiment of FIG. 1.

Referring to FIGS. 1 and 2 a toothbrush head 10 and the immediately adjacent part of the neck 11 is shown. The entire toothbrush comprises the head 10 and a grip handle (not shown), disposed along a longitudinal head-handle direction L-L, with the neck 11 longitudinally in between the head 10 and handle. The head 10 is generally elongate between a tip 12 distant from the handle and a base 13 closest to the handle. The head 10 is flattened in its thickness direction T generally perpendicular to the longitudinal direction L-L, and has a widthwise direction W-W perpendicular to both the longitudinal L-L and thickness T directions.

The head 10 comprises two longitudinally sequentially disposed segments 14, 15 flexibly and resiliently linked to each other by link 16. These segments 14, 15 are a substantially rigid base segment 14 adjoining the toothbrush neck 11 and extending from the base end 13 of the head to the link 16, and a tip segment 15 extending from the tip 12 of the head to the link 16. The base segment 14 extends for at least 60% of the distance between the base end 13 of the head and the tip 12 of the head. The face 17 of the tip segment 15 forms an angle of 155°-170° with the face 18 of the base segment.

The link 16 is of a known type as described for example in applicant's WO-A-97/07707 and as used in the applicant's Dr BEST SENSORKOPF™ toothbrushes and comprises a thin leaf (not shown) of plastic material linking the segments 14, 15 and completely enclosed in an elastomer material.

Between the base segment 14 and the neck 11 there is a resiliently flexible link 19. This link 19 comprises a thin, flexible plastic material spine (not shown) integrally linking the base segment 14 head and neck 11, wholly or partly surrounded by a surrounding mass of elastomer with a generally spherical profile. The construction of flexible link 19 is as disclosed in WO-A-97/24949. The face 17, 18 of the head has side edges 110, aligned at a shallow convergent angle to the longitudinal direction L-L.

The overall construction of the head and neck of all the toothbrushes shown in FIGS. 1 to 11 is the same as FIGS. 1 and 2, but different types and configurations of elastomeric oral hygiene parts and bristles are disclosed, as discussed below.

Referring to FIGS. 1 and 2, a plurality of elastomeric oral hygiene parts 21 are mounted on the face 17 of the tip segment 15, and conventional bristles 22 are the only oral hygiene parts present mounted on the face 18 of base segment 14.

In FIGS. 1 and 2 the elastomeric oral hygiene parts 21 comprise cylindrical elastomeric fingers, typically ca. 1-1.5 mm diameter, and about the same length as the conventional bristles 22. Seven of the cylinders 21 are mounted in a polygonal cluster, in the form of a hexagon of the cylinders 21 surrounding a central cylinder 21. As shown in FIG. 1 the fingers 21 extend perpendicularly from the face 17 of the tip segment 15 in a length direction "1". The elastomeric material of the cylinders 21 is integrally extended to cover the face 17 of the tip segment 15, for example by leaving a suitable cavity in the plastic material "skeleton" of which the plastic material parts of the toothbrush are made, and into which the elastomeric material is subsequently injected. Such processes are well known.

As shown in FIG. 1 the bristles 22 also extend perpendicularly from the face 18 of the base segment 14, i.e. perpendicularly to both the longitudinal direction L-L and the width direction W-W. In an alternative configuration shown in FIG. 2, the bristles 22 are arranged in substantially longitudinal rows of tufts, and all the tufts in a row are aligned non-perpendicularly at around ca. 80° to the plane of the face 18. The tufts 22A of bristles in outermost longitudinal rows lean toward the base 13 of the head, and tufts 22B in widthwise inward rows lean toward the tip 12 of the head 10. Consequently as would be seen looking in the width direction W-W the tufts 22A and 22B are seen to cross each other to form an "X" shape.

Figure 3:
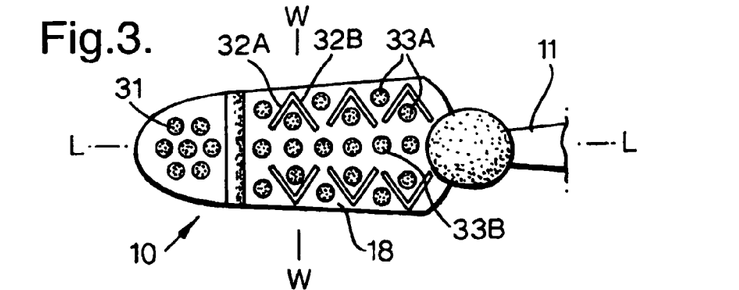
FIG. 3 shows a plan view of another embodiment of a toothbrush head according to this invention.
Figure 4:
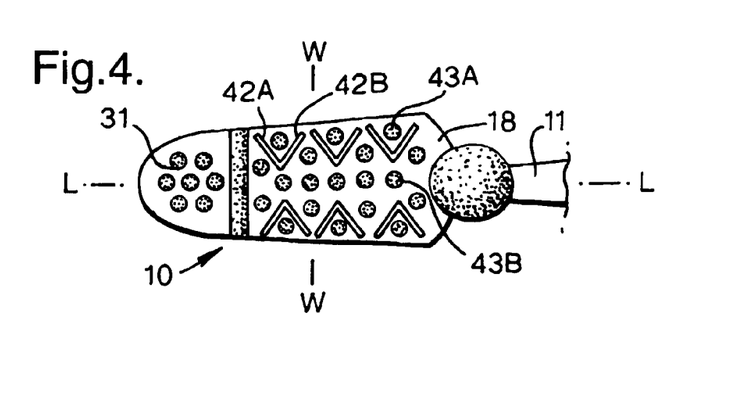
FIG. 4 shows a plan view of another embodiment of a toothbrush head according to this invention.
Figure 5:
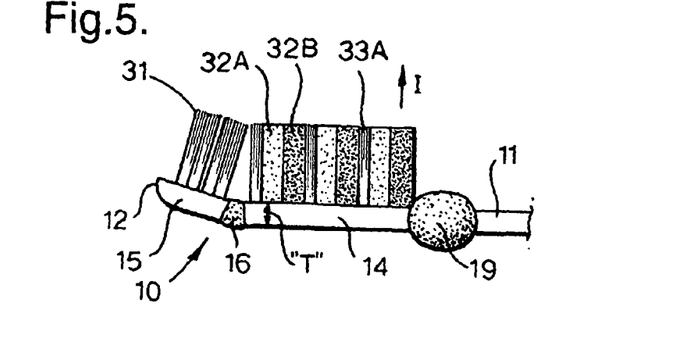
FIG. 5 shows a side view of the toothbrush head of FIG. 3.

Referring to FIGS. 3, 4 and 5, toothbrush heads 10 are shown in plan and in a side view. The overall construction of the head 10 is identical to FIGS. 1 and 2, i.e. a base segment 14 and a tip segment 15, angled as shown in FIG. 1, with a resilient flexible link 16 between them, and a resilient flexible link 19 between the base segment 14 and the neck 11.

Mounted on the tip segment 15 is a polygonal cluster of seven tufts of bristles 31 in the form of a hexagon of tufts surrounding a central tuft.

Mounted on the base segment 14 are elastomeric oral hygiene parts 32, each comprising a strip extending in a strip length direction "1" and having a cross section cut across the strip length direction "1" of a chevron cross section. Each limb 32A, 32B of the chevron is itself in the form of a strip of elastomeric material extending in the strip length direction, the strips converging to define an angle ca. 90° between them, and integrally formed at the angle of the chevron. Each limb 32A, 32B has a strip width direction generally perpendicular to the strip length direction, and a strip thickness direction generally perpendicular to both the strip length and strip width direction, the strip thickness dimension being less than the strip width direction. Each of the limbs 32A, 32B has its width direction aligned at ca. 45° to the longitudinal direction L-L.

Bristles 33 are also shown mounted on the face 18 of the base segment 15. The bristles 33 are arranged on the face 18 in tufts containing a plurality of bristles, shown being of circular cross section cut across the bristle direction, and shown mounted in the head with their bristle direction substantially perpendicular to the face.

As shown in FIG. 3 a plurality of the elastomeric oral hygiene parts 32 are arranged along the perimeter of the cluster of bristles 33 and parts 32, with the point of the chevron pointing inwardly toward the longitudinal centre line of the head 10. FIG. 4 shows a head construction analogous to that of FIG. 3, but with strips 42 having the point of the chevron pointing outwardly away from the longitudinal centre line of the head 10.

Bristle tufts 33A, 43A are located in the "bite" between the converging limbs of the strips 32, 42. Although shown as having a circular cross section such tufts may conveniently have a triangular cross section, so that they nest neatly into the bite of the chevron section of the elastomer strip 32, 42. About the centre of the cluster of strips and bristles there are further tufts of bristles 33B, 43B arranged in a longitudinal row. The strips 32, 42 project to the same or approximately the same length from the face as the bristles 33, 43. The strip thickness dimension is in the range 0.1 to 1.00 mm.

Figure 6:
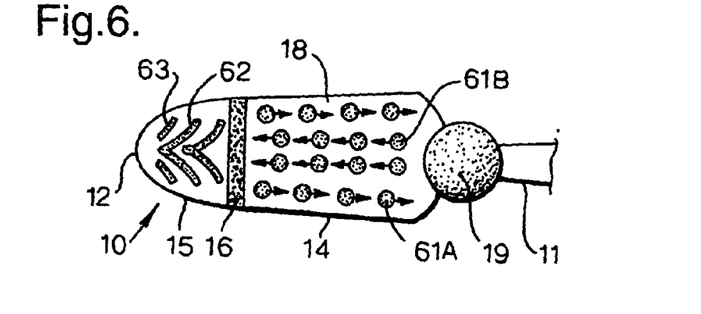
FIG. 6 shows a plan view of another embodiment of a toothbrush head according to this invention.
Figure 7:
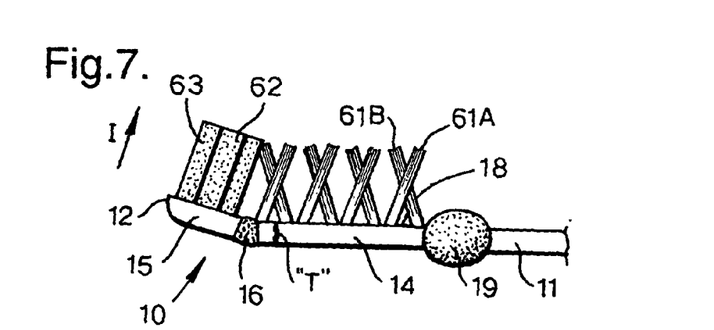
FIG. 7 shows a side view of the toothbrush head of FIG. 6.

Referring to FIGS. 6 and 7 a toothbrush head 10 is respectively shown in plan and a side view. The overall construction of the head 10 is identical to FIGS. 1 and 2, i.e. a base segment 14 and a tip segment 15, angled as shown in FIG. 1, with a resilient flexible link 16 between them, and a resilient flexible link 19 between the base segment 14 and the neck 11.

Mounted on the base segment 14 is a plurality of bristle tufts 61A, 61B, which lean identically as in the tufts of FIG. 2. The tufts 61A of bristles in outer longitudinal rows lean toward the base 13 of the head, and tufts 61B in widthwise inward rows lean toward the tip 12 of the head 10. Consequently as is seen looking in the width direction W-W the tufts 61A and 61B are seen to cross each other to form an "X" shape. In FIG. 6 the tufts 61A and 611B are also distanced longitudinally.

Mounted on the tip segment 15, are a plurality of chevron sectioned elastomeric strips 62 with the point of their chevron pointing in a direction parallel to the longitudinal direction away from the handle. Two such strips 62 are shown, longitudinally adjacent to each other, with the point of one nesting into the "bite" of the other which is located nearer to the tip 12. Also mounted on the tip segment 14 are two generally rectangular or flattened oval sectioned strips 63 flanking each widthwise side of the strips 62. The limbs of the chevron 62 are slightly curved to present a concave surface facing outwardly. The strips 62, 63 extend substantially perpendicular to the plane of the face 17 of tip segment 15. As in FIG. 2 The elastomeric material of the strips 21 is integrally extended to cover the face of the tip segment 15.

Figure 8:
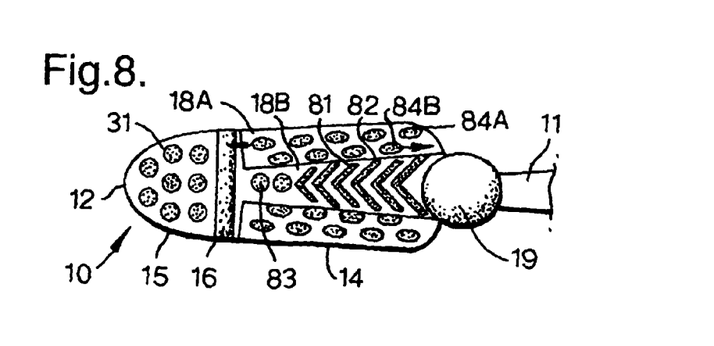
FIG. 8 shows a plan view of another embodiment of a toothbrush head according to this invention.
Figure 9:
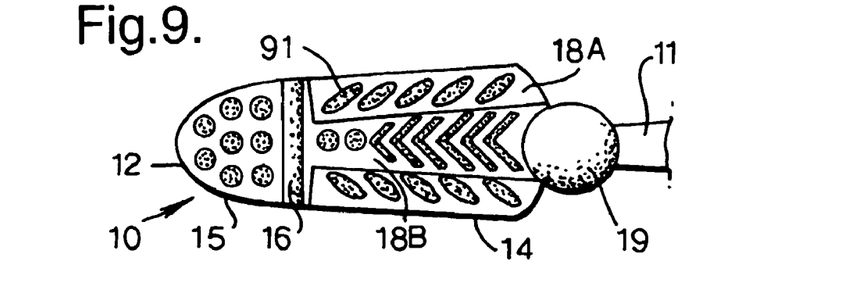
FIG. 9 shows a plan view of another embodiment of a toothbrush head according to this invention.
Figure 10:
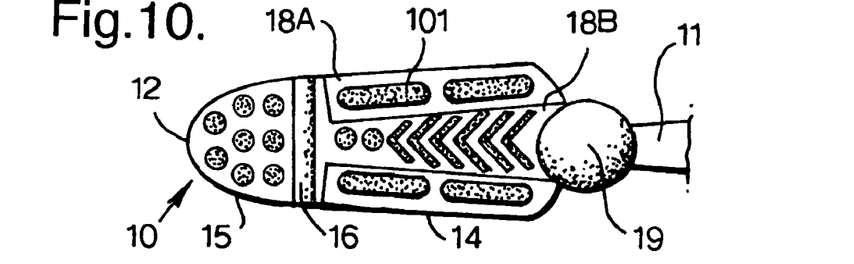
FIG. 10 shows a plan view of another embodiment of a toothbrush head according to this invention, FIG. 10A showing a detailed side view.

Referring to FIGS. 8, 9 and 10 a toothbrush head 10 is respectively shown in plan and a side view. The overall construction of the head 10 is identical to FIGS. 1 and 2, i.e. a base segment 14 and a tip segment 15, angled as shown in FIG. 1, with a resilient flexible link 16 between them, and a resilient flexible link 19 between the base segment 14 and the neck 11. The face 18 of the base segment 15 is stepped to define two levels, comprising a central longitudinally aligned raised platform 18A, flanked on both widthwise adjacent sides by relatively lower areas 18B.

Mounted on the tip segment 15 of each head 10 is a polygonal cluster of eight tufts of bristles 31 in the form of an irregular heptagon of tufts surrounding a central tuft.

Mounted on the central platform 18B of base segment 14, are a plurality of chevron sectioned elastomeric strips 81 each with the point of their chevron pointing in a direction parallel to the longitudinal direction away from the handle. Also mounted on the central platform 18B are a plurality of bristle tufts 82 having a cross section cut across the bristle direction which is of a chevron shape. Each limb of the chevron comprises a bar of bristles aligned at ca. 45° to the longitudinal axis of the head, and merging at the fold or apex of the chevron, so that the bite of the chevron encloses ca 90°. Each chevron sectioned tuft is aligned like the elastomeric parts 81, i.e. pointing in the longitudinal direction away from the handle. The parts 81 and tufts 82 are nested, comprising a longitudinal sequence of alternating tufts 82 and elastomeric oral hygiene parts 81. Also mounted on the central platform 18A are circular section bristles 83, between the flexible link 16 and the closest of the parts 81 to tip 12. The strips 81 and tufts 82, 83 extend substantially perpendicular to the plane of the platform 18B of base segment 14 and are all of substantially the same length.

Mounted on the lower areas 18A of base segment 15 of each of the heads of FIGS. 8, 9 and 10 is a plurality of bristle tufts 84A, 84B, 91, 101.

In FIG. 8 the tufts 84A, 84B are oval sectioned with the long dimension of the oval parallel to the side edges of the base segment 14. The tufts 84A of bristles, are arranged as the outermost longitudinal rows, and lean toward the tip 12 of the head, and tufts 84B in widthwise inward rows lean toward the base 13 of the head 10, as is shown by the arrows indicating the direction of lean of one representative tuft of the row. Consequently as would be seen looking in the width direction W-W the tufts 84A and 84B cross each other to form an "X" shape analogous to FIG. 7.

In FIG. 9 the arrangement on the tip segment 15 and central platform 18B is the same as FIG. 8 so is not described in detail. Tufts 91 are arranged longitudinally on the outer levels 18A. Tufts 91 are oval sectioned with the long dimension of the oval aligned at ca. 45° to the longitudinal axis of the head, i.e. approximately parallel to the limbs of the chevrons on the central platform 18B. The long dimensions of the cross sections of widthwise separated tufts 91 converge toward the tip 12 of the head. The length to which the tufts 91 extend from the face alternate longitudinally between greater and lesser lengths.

Figure 10A:
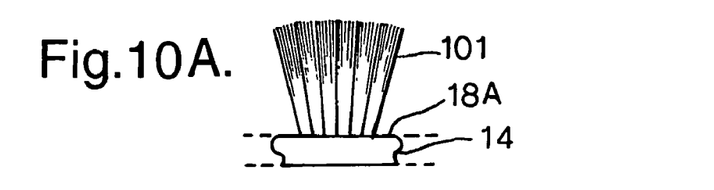

In FIG. 10 the tufts 101 have an elongate cross section cut across the bristle direction in the form of a bristle bar of generally rectangular cross section, with the long dimension of the cross section aligned substantially parallel to the longitudinal edges of the toothbrush head 10. As shown in FIG. 10A bristles in tufts 101 lean at a non perpendicular angle toward the tip or the base of the head. At the longitudinally central position in tufts 101 the bristles are aligned perpendicular to the face 18A. On each longitudinally opposite side of this central position the angle of lean progressively increases, to a maximum of ca. 80° at the longitudinal ends of the tufts 101, so the bristles are in a fan-like arrangement.

Figure 11:
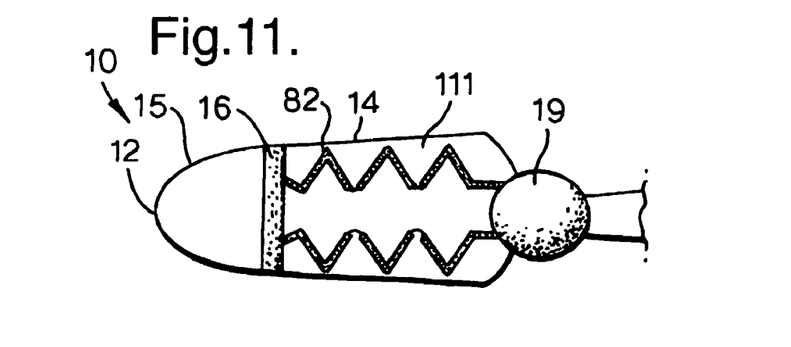
FIG. 11 shows an underside view of the toothbrush of FIG. 3.

Referring to FIG. 11, an underside view of the toothbrush head of FIG. 3 or 4 is shown, looking at the face 111 opposite to that 18 from which the elastomer parts extend. The elastomer parts, i.e. the oral hygiene parts 32, 42 and elastomeric parts of the links 17, 19 are linked by means of moulding channels in face 111 and passing through the thickness T of the head 10, so that the same elastomeric material and single point injection thereof may be used.

Figure 12:
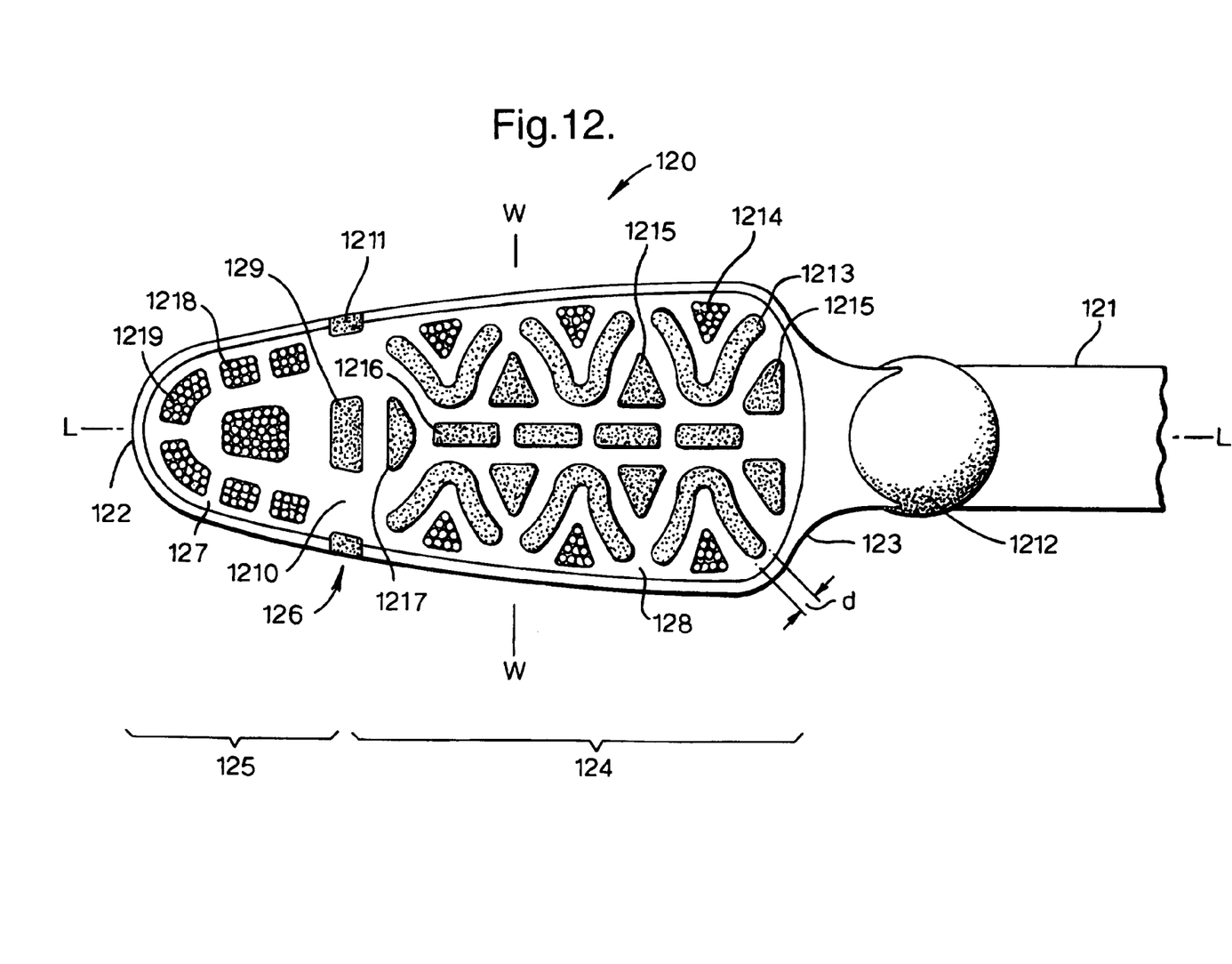
FIG. 12 shows a plan view of another embodiment of a toothbrush head according to this invention.

Referring to FIG. 12 another toothbrush head 120 of this invention is shown in plan view. The entire toothbrush comprises the head 120 and a grip handle (not shown), disposed along a longitudinal head-handle direction L-L, with the neck 121 longitudinally in between the head 120 and handle. The head 120 is generally elongate between a tip end 122 distant from the handle and a base end 123 closest to the handle. The head 120 has a widthwise direction W-W perpendicular to the longitudinal L-L direction. The head 120 is flattened in its thickness direction i.e. in the direction perpendicular to the plane of the drawing.

The head 120 comprises two longitudinally sequentially disposed segments, 124,125 viz. a substantially rigid base segment 124 adjoining the toothbrush neck 121 and extending from the base end 123 of the head to a link 126, and a tip segment 125 extending from the tip 122 of the head to the link 126. The base segment 124 extends for ca. 65% of the distance between the base end 123 of the head to the tip 122 of the head. The face 127 of the tip segment 125 forms an angle of 155°-170° with the face 128 of the base segment 124, i.e. an arrangement similar to FIGS. 1-7 and having a side view (not shown) similar to FIG. 1,5 or 7.

The link 126 is of a known type as described for example in applicant's WO-A-97/07707 and as used in the applicant's Dr BEST SENSORKOPF™ toothbrushes. The link 126 comprises a groove in the opposite surface to the surface 127, 128, which in one or more place 129 cuts completely through the thickness of the head 120. In other places the groove cuts only partly through the thickness of the head 120, leaving a thin residual flexible leaf 1210 of plastic material, coplanar with the surfaces 127, 128, linking the segments 124, 125. The groove is filled with an elastomer material 1211. The elastomer material 1211 is suitably the elatomer material as known for use in known toothbrushes having flexibly linked segments.

Between the base segment 124 and the neck 121 there is a resiliently flexible link 1212 having a construction identical to that of link 19 described above.

Mounted on the face 127 of base segment 124 are plural elastomer oral hygiene parts 1213 arranged sequentially longitudinally. These parts 1213 each comprise a strip of elastomeric material extending in a strip length direction perpendicular to the plane of the drawing, and having a cross section of a "V" or chevron shape, however with the limbs of the chevron being slightly curved to present a concave surface outwardly, and the point of the chevron is rounded. The point of each chevron points inwardly away from the adjacent outer edge of the face 127. The angle between the limbs of each chevron sectioned strip 1213 is ca. 60°, and the strip thickness dimension "d" is ca. 0.9 mm.

Also mounted on the face 127 are bristle tufts 1214, 1215, 1216, 1217, 1218, 1219. Tufts 1214 are triangular in cross section with an apex pointing inwardly and a base generally parallel to the edge of face 127, and of a shape conforming to and nesting into the "bite" of the chevrons 1213. Tufts 1215 are also triangular in cross section and are shaped such that their sides are generally parallel to, and nest into the generally triangular space between, the limbs of longitudinally adjacent chevrons 1213, with apexes pointing outwardly. Tufts 1216 are of an elongate generally rectangular cross section cut across the bristle direction, the long dimension of the elongate cross section being aligned parallel to the longitudinal axis L-L of the toothbrush head 120. Tuft 1217 is also of a gerally triangular cross section cut across the bristle direction, nesting into the bite between the limbs of two adjacent chevrons 1212. Mounted on the face 128 of the tip segment are bristle tufts 1218 of a generally rectangular cross section as cut across the bristle direction. The pattern of tufts 1218 comprise a central tuft, with adjacent tufts following the perimeter of the face 128. Tufts 1219 are of a curved cross section corresponding generally to the arc of the tip end 122.

The elastomer material of the strips 1212 may pass completely through the head 120 and be linked at the opposite face, as shown in FIG. 3.

Typically the elastomeric material of cylinders 21 and strips 32, 42, 62, 63, 81, 1213 is a thermoplastic elastomeric material which can be injection moulded. Typically in its set state the elastomeric material has a hardness from about 10 to about 90 Shore A, more preferably 30 Shore A or greater, e.g. from about 35 to about 55 Shore A.

The invention claimed is:

1. A toothbrush head having a tip end and a base end, the base end being connected or connectable to a toothbrush handle and having a longitudinal direction between the tip end and base end, having a widthways direction perpendicular to said longitudinal direction and having a face having widthways opposite edges, and having an elastomeric oral hygiene part mounted on the face, the elastomeric oral hygiene part comprising an adjacent pair of elastomeric strips which each project from the face of the toothbrush head in a strip length direction, each elastomeric strip having a strip width direction generally perpendicular to the strip length direction the strip width dimension being less than the strip length dimension, and a strip thickness direction generally perpendicular to both the strip length and strip width direction, the strip thickness dimension being less than the strip width dimension,
   wherein two said adjacent strips are linked such that the pair of strips comprise a single elastomeric oral hygiene part with a cross section, cut across the strip length direction, which is chevron shaped comprising said strips converging to meet at an apex, the strips converging in a direction transverse to the longitudinal direction of the head to define an angle of less than 180° between them, and wherein plural said elastomeric oral hygiene parts are arranged on said face sequentially longitudinally and adjacent to said widthways opposite edges with the apex of the chevron shape pointing inwardly away from said widthways opposite edges of said face.

2. A toothbrush head according to claim 1 wherein the adjacent strips are aligned so that their respective width directions converge to define an angle of 90-60° between them.

3. A toothbrush provided with a head as claimed in claim 2.

4. A toothbrush head according to claim 1 wherein one or more tuft containing a plurality of bristles, each bristle extending in a bristle direction from the face, said tuft having a non-circular cross section cut across the bristle direction, is mounted on the face.

5. A toothbrush head according to claim 4 wherein said tuft having a non-circular elongate cross section is substantially rectangular with its long dimension aligned substantially parallel to or perpendicular to the longitudinal direction of the head.

6. A toothbrush provided with a head as claimed in claim 5.

7. A toothbrush head according to claim 4 wherein said tuft having a non-circular elongate cross section is triangular in section.

8. A toothbrush provided with a head as claimed in claim 7.

9. A toothbrush head according to claim 7 wherein said triangular section tuft nests between two adjacent convergent elastomer strips of an elastomeric oral hygiene part.

10. A toothbrush provided with a head as claimed in claim 9.

11. A toothbrush provided with a head as claimed in claim 4.

12. A toothbrush head according to claim 1 comprising two or more longitudinally disposed segments flexibly and resiliently linked to each other, one or more of the segments having a face on which is mounted the said one or more elastomeric oral hygiene part, said head being connected by a resiliently flexible link to the handle.

13. A toothbrush provided with a head as claimed in claim 12.

14. A toothbrush head according to claim 12 wherein the segments comprise a substantially rigid base segment adjoining the toothbrush neck and extending from the base end of the head to a resilient flexible link situated between the base end and the tip, and a tip segment extending from the tip of the head to the link, the tip segment being flexibly and resiliently linked at a link to the base segment, the base segment extending for at least 50% of the distance between the tip end and the base end.

15. A toothbrush head according to claim 14 wherein the tip segment has bristles but no elastomeric oral hygiene parts mounted thereon, and the base segment has elastomeric oral hygiene parts mounted thereon.

16. A toothbrush provided with a head as claimed in claim 14.

17. A toothbrush provided with a head as claimed in claim 15.

18. A toothbrush provided with a head as claimed in claim 1.

19. A toothbrush head according to claim 1 comprising two or more longitudinally disposed segments flexibly and resiliently linked to each other, one or more of the segments having a face on which is mounted the said one or more elastomeric oral hygiene part.

20. A toothbrush provided with a head as claimed in claim 19.

21. A toothbrush head according to claim 19 wherein the segments comprise a substantially rigid base segment adjoining the toothbrush neck and extending from the base end of the head to a resilient flexible link situated between the base end and the tip, and a tip segment extending from the tip of the head to the link, the tip segment being flexibly and resiliently linked at a link to the base segment, the base segment extending for at least 50% of the distance between the tip end and the base end.

22. A toothbrush head according to claim 21 wherein the tip segment has bristles but no elastomeric oral hygiene parts mounted thereon, and the base segment has elastomeric oral hygiene parts mounted thereon.

23. A toothbrush provided with a head as claimed in claim 22.

24. A toothbrush provided with a head as claimed in claim 21.

25. A toothbrush head according to claim 1 characterized by being connected by a resiliently flexible link to the handle.

26. A toothbrush provided with a head as claimed in claim 25.

27. A toothbrush comprising a head and a grip handle, disposed along a longitudinal head-handle direction, and having a widthways direction perpendicular to said longitudinal direction, with a neck longitudinally in between the head and the handle, the head being elongate between a tip end distant from the handle and a base end closest to the handle, and being flattened in a thickness direction generally perpendicular to the longitudinal direction, and having a widthways direction perpendicular to both the longitudinal and thickness directions, the toothbrush head comprising two or more longitudinally sequentially disposed hard plastics material segments flexibly and resiliently linked to each other at a link, and comprising a substantially rigid base segment adjoining the toothbrush neck and extending from the base end of the head to a resilient flexible link situated between the base end and the tip, and a tip segment extending from the tip of the head to the link, wherein the base segment extends for at least 60% of the distance between the tip end and the base end, wherein the base segment of the head is connected by a resiliently flexible link to the handle, and wherein the face of the tip segment forms an angle less than 180° with the face of the base segment, and one or more of the segments having a face on which is mounted one or more elastomeric oral hygiene part, the elastomeric oral hygiene part comprising an adjacent pair of elastomeric strips which each project from the face of the toothbrush head in a strip length direction, each elastomeric strip having a strip width direction generally perpendicular to the strip length direction the strip width dimension being less than the strip length dimension, and a strip thickness direction generally perpendicular to both the strip length and strip width direction, the strip thickness dimension being less than the strip width dimension, wherein two said adjacent strips are linked such that the pair of strips comprise a single elastomeric oral hygiene part with a cross section, cut across the strip length direction, which is chevron shaped, the strips converging in a direction transverse to the longitudinal direction of the head to define an angle of less than 180° between them, and wherein plural said elastomeric oral hygiene parts are arranged on said face sequentially longitudinally and adjacent to said widthways opposite edges with the apex of the chevron shape of the chevron shape pointing inwardly away from said widthways opposite edges of said face.

\* \* \* \* \*